United States Patent

Turek

[15] 3,704,628

[45] Dec. 5, 1972

[54] FLUIDIC ANGULAR ACCELERATION SENSOR

[72] Inventor: Robert F. Turek, Silver Spring, Md.

[73] Assignee: The United States of America as represented by the Secretary of the Navy

[22] Filed: Feb. 24, 1971

[21] Appl. No.: 118,264

[52] U.S. Cl. .................................................. 73/515
[51] Int. Cl. ............................................. G01p 15/02
[58] Field of Search .............................. 73/515, 514

[56] References Cited

UNITED STATES PATENTS

| | | |
|---|---|---|
| 3,540,268 | 11/1970 | Kantola et al. ............ 73/515 X |
| 3,513,710 | 5/1970 | Bates et al. ............... 73/515 X |
| 3,541,865 | 11/1970 | Brown ......................... 73/515 |
| 3,490,293 | 1/1970 | Evans .......................... 73/515 |

*Primary Examiner*—James J. Gill
*Attorney*—R. S. Sciascia, Henry Hansen and Gilbert H. Hennessey

[57] ABSTRACT

A rotationally balanced air bearing-supported inertial or seismic mass having squeeze-film damping is arranged such that a flapper connected to the mass proportions airflow through parallel orifices legs of a fluidic bridge network under applied angular acceleration to provide a differential pressure output linearly related thereto.

4 Claims, 9 Drawing Figures

INVENTOR.
ROBERT F. TUREK
BY
ATTORNEYS

INVENTOR.
ROBERT F. TUREK

INVENTOR.
Robert F. Turek
BY
ATTORNEYS

3,704,628

FLUIDIC ANGULAR ACCELERATION SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates in general to the fields of accelerometers and fluidic sensing devices, and more particularly to improved fluidic acceleration sensors providing differential pressure outputs linearly related to applied acceleration.

In the past fluidic systems providing direct measurement of angular acceleration were unavailable. One indirect approach employed a vortex rate sensor, a well-known fluidic device. The typical vortex rate sensor yields a differential pressure output proportional to angular velocity, from which angular acceleration may be derived by a mathematical step known as differentiation. While fluidic differentiators exist, impedance matching is necessary, and noise at the input to the differentiator introduces significant error in its output. The need for a simple approach is indicated, a sensor whose inherent output is a linear function of angular acceleration.

SUMMARY OF THE INVENTION

Accordingly, the general purpose of the invention is to generate by fluidic means a pressure output linearly related to angular acceleration. Another object of the invention is to simplify the structural requirements for an angular acceleration sensor to provide a compact, inherently stable sensing device. These and other objects of the invention are achieved by mounting an inertial mass in thrust and journal air bearings for balanced rotation parallel, for example, to the pitch axis of an aircraft. Extending radially from the seismic mass, a rigid flapper is positioned in the space between two vertically aligned air nozzles. Under applied angular acceleration the flapper proportions the airflow through respective legs of a bridge network connected to the nozzle orifices. The differential pressure output is linear with respect to angular acceleration due to the strong force feedback mechanism on the flapper and squeeze-film damping plates adjacent to the inertial mass.

DESCRIPTION OF THE PREFERRED EMBODIMENT

Figure 1:
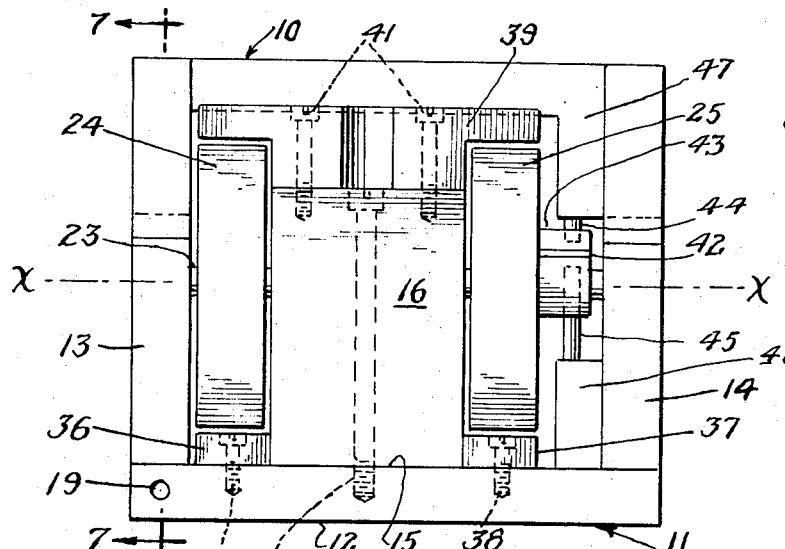
FIG. 1 represents a front elevation view of a fluidic angular acceleration sensor according to the invention.
Figure 2:
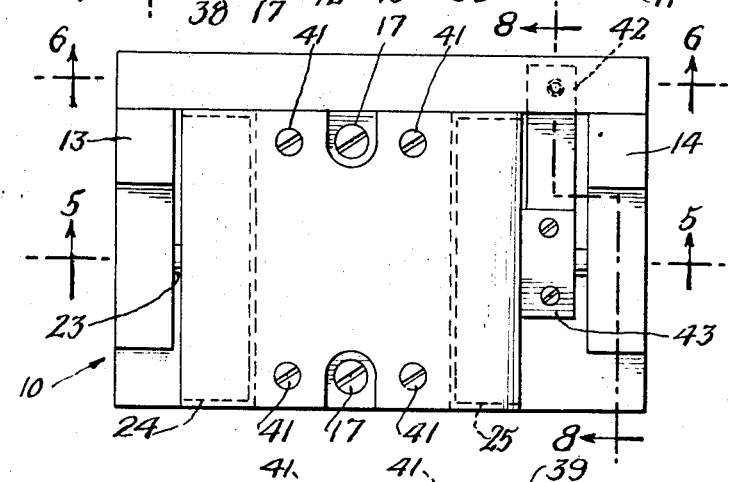
FIG. 2 represents a plan view of the sensor of FIG. 1.
Figure 3:
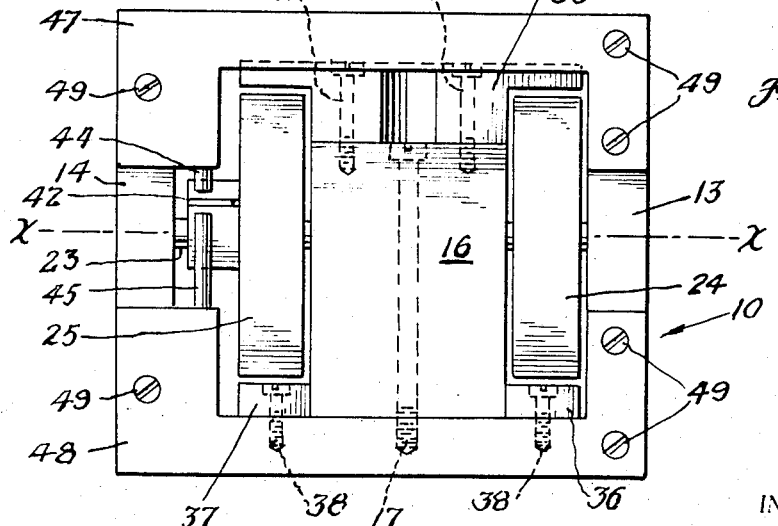
FIG. 3 represents a rear elevation view of the sensor of FIG. 1.
Figure 4:
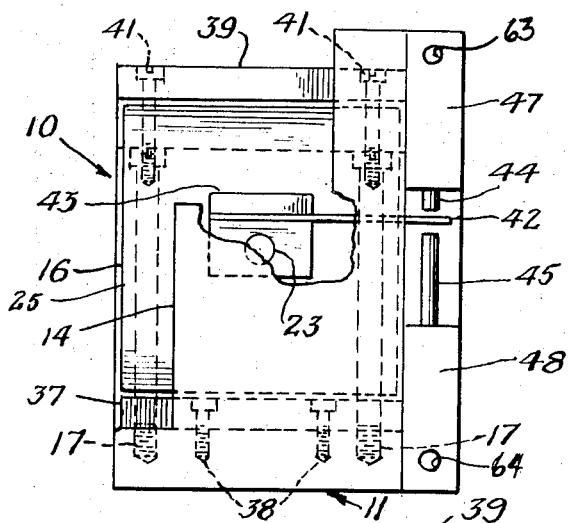
FIG. 4 represents an end elevation view of the sensor from the right end in FIG. 1.
Figure 5:
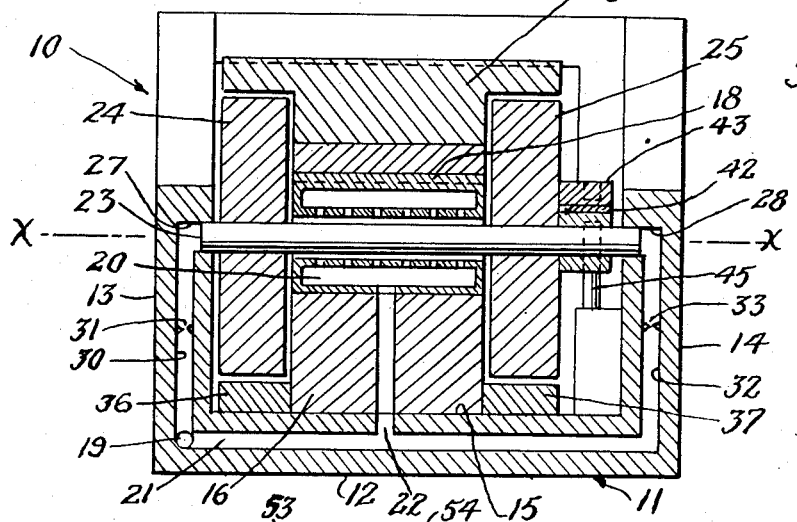
FIG. 5 represents a cross-sectional elevation view of the sensor along the line 5—5 in the direction of the arrows in FIG. 2.
Figure 6:
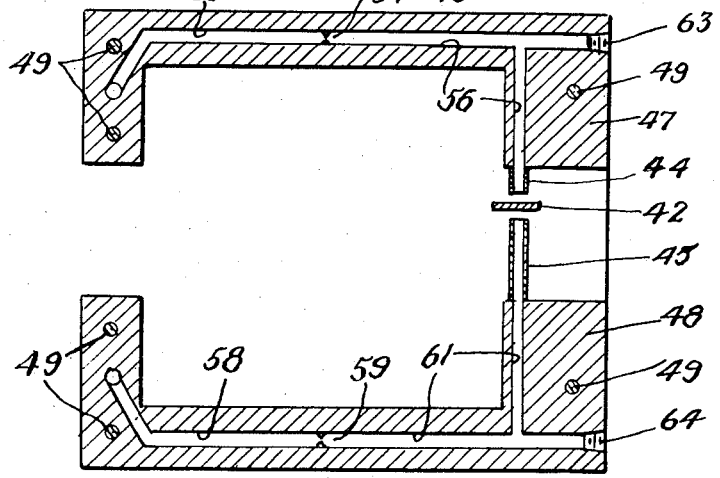
FIG. 6 represents a cross-sectional elevation view of the sensor along the line 6—6 in the direction of the arrows in FIG. 2.
Figure 7:
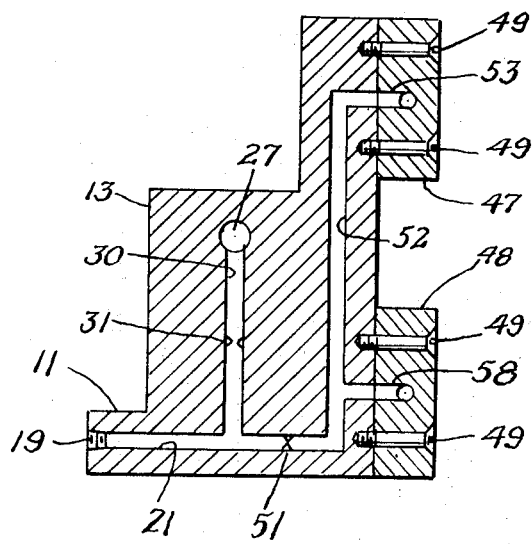
FIG. 7 represents a cross-sectional elevation view of the sensor along the line 7—7 in the direction of the arrows in FIG. 1.
Figure 8:
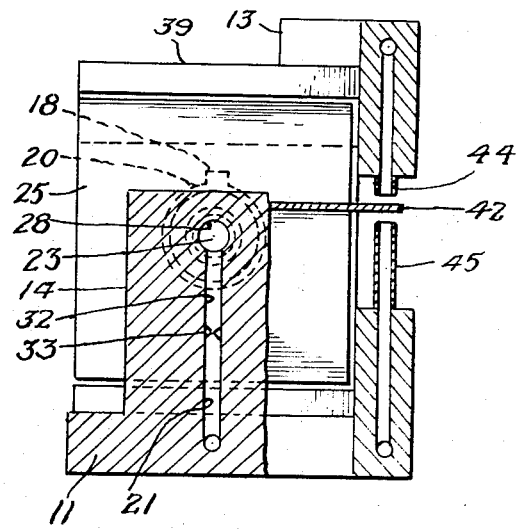
FIG. 8 represents a cross-sectional elevation view of the sensor along the line 8—8 in the direction of the arrows in FIG. 2.

Referring now to the drawing, a fluidic angular acceleration sensor 10 is illustrated as having a rectangular base 11 with a lower planar surface 12 adapted to be rigidly mounted on an object, such as aircraft structure, whose angular acceleration is to be measured. Base 11 includes left and right parallel upright arms 13 and 14 formed at respective ends. A bearing support 16 is secured to an upper planar surface 15 of base 11 between arms 13 and 14 by two bolts 17. As best seen in FIGS. 5 and 8, support 16 houses an air-lubricated journal bearing 20 secured against rotation relative to support 16 by a slotted key 18. A source of air pressure, not shown, connected to an air inlet port 19 in base 11 communicates with the bearing 20 via channel 21 in base 11 and channel 22 in support 16. A sensor designed according to the invention utilized an air supply pressure of 10.8 psig.

A shaft 23 is supported in bearing 20 and its axis constitutes the angular acceleration sensing axis $x$—$x$. Adjacent either end of bearing 20 are seismic masses 24 and 25 affixed to shaft 23 for rotation therewith. It will be understood that all elements affixed to shaft 23 contributing to moment of inertia must be carefully balanced to eliminate any net torque. The masses 24 and 25 are of square configuration in planes normal to axis $x$—$x$ with their geometric centers coinciding therewith and their sides being substantially normal to surface 15. The ends of shaft 23 protrude into air-lubricated thrust bearings 27 and 28 formed in the confronting surfaces of arms 13 and 14 respectively. Bearing 27 communicates with port 19 via orifice 31, and channel 30; and bearing 28 communicates with port 19 via channel 21 and orifice 33, and channel 32.

Since there is no significant viscous or coulomb damping in the sensor, a damping force must be provided to stabilize the sensor. This is accomplished with two lower damper plates 36 and 37 secured adjacent to the lower surfaces of masses 24 and 25 by four bolts 38 to the top surface of base 11 at either end of bearing support 16. An upper damper plate 39 is secured by four bolts 41 to the upper surface of support 16 and extend over the upper surfaces of masses 24 and 25. The surfaces of damper plates 36, 37 and 39 which confront surfaces of masses 24 and 25 are juxtapositioned to form air film gaps and rotation of shaft 23 tends to squeeze the air films producing a damping effect.

Intermediate the confronting surfaces of upright arm 14 and seismic mass 25 a flapper arm 42 is affixed by clamp 43 to shaft 23 for rotation therewith. The distal end of arm 42 extends laterally beyond the rear surface of mass 25 and is juxtapositioned between opposed upper and lower air nozzles 44 and 45 in upper and lower nozzle support bars 47 and 48, respectively, which in turn are secured at their ends to upright arms 13 and 14 by six bolts 49. Air at nozzle 44 communicates from inlet port 19 via channel 21, orifice 51, channels 52 and 53, orifice 54, and channel 56. Air at nozzle 45 is furnished from inlet port 19 via channel 21, orifice 51, channels 52 and 58, orifice 59, and channel 61. The pressure variations in channels 56 and 61 due to displacement of flapper arm 42 are measured at air outlet ports 63 and 64 in bars 47 and 48 by pressure sensing means not shown. In addition to the damping forces produced by the air film at masses 24 and 25, feedback forces also occur on flapper 42 due to the differential pressure at nozzles 44 and 45. The magnitude of the feedback force is dependent on the rate of change of the displacement of flapper 42 in addition to the angular acceleration force. The total damping force varies with frequency and is governed by the lead-lag characteristics of the pneumatic bridge network defined by nozzles 44 and 45, and orifices 51, 54 and 59. Appropriate sizing of the nozzles and orifices may be made to produce maximum damping (i.e. feedback force) at the crossover frequency of the sensor 10.

Figure 9:
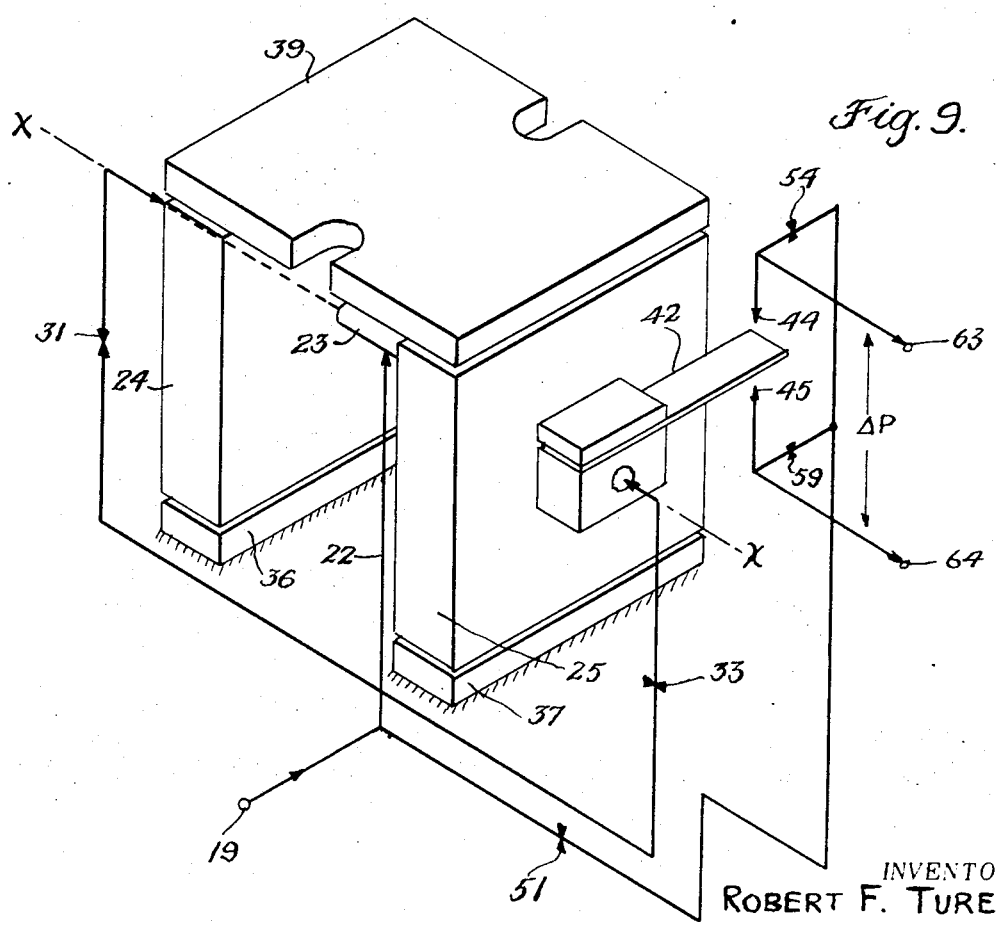
FIG. 9 is a schematic diagram of selected elements of the sensor of FIG. 1.

Operation of the sensor 10 should now be readily apparent and will be briefly described with reference to the schematic diagram of FIG. 9. Angular acceleration of damper plates 36, 37 and 39 (fixed to the object) about an axis parallel to sensing axis $x-x$ results in a change in the relative orientation of inertial masses 24 and 25. The resultant movement of flapper 42 reproportions the air flow from orifices 44 and 45 thereby producing a differential pressure output, $\Delta P$, which is linearly related to the angular acceleration of the object due to the strong feedback force on flapper 42. Rotation occurs between the inertial mass and plates 36, 37 and 39 until there is sufficient differential pressure on flapper 42 to generate an equilibrating torque. Static friction in air bearings 20, 27 and 28 is immeasurably small and therefore will not detract from the linearity of the system response. For the same reason, threshold hysteresis and resolution errors are negligible.

The gain of the fluidic angular acceleration sensor is related to its geometry according to the following equation:

$$\frac{\Delta P}{\ddot{\theta}} = -\left(\frac{I}{AR}\right)$$

where $\Delta P$ = differential output pressure, $\ddot{\theta}$ = angular acceleration, $I$ = polar moment of inertia of the sensing mass including inertial masses 24 and 25, flapper 42 and shaft 23, $A$ = face area of nozzles 44 and 45, and $R$ = average radial distance of the two nozzles from sensing axis $x-x$. Thus, the gain can be adjusted by varying $I$, $A$ or $R$. In FIG. 9, adjustment of $R$ would be accomplished by using spacers or plural gaskets in mounting nozzle bars 47 and 48. By varying the individual spacings of these bars from arms 13 and 14, it is possible to adjust the system for null output to achieve $\Delta P$ for zero angular acceleration. Without such adjustment, this might not be the case since slight inequalities in orifices 54 and 59 or nozzles 44 and 45 would introduce error.

Alternately, a single seismic mass can be used in place of the two masses 24 and 25 by providing a suitable journal air bearing arrangement. In addition, flapper 42, masses 24 and 25, and shaft 23 can be formed as an integral unit. However, for trimming rotational balance it is desirable to have the elements separate.

The sensor may be directly coupled to a utilization device without an impedance matching circuit since the necessary impedance can be obtained by proper sizing of nozzles 44 and 45.

Compared to more complex systems, the invention offers the advantage of high resolution and linearity in a device which is easy to manufacture, adjust and maintain. The sensor is rugged and compact with minimum space and power requirements.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A fluidic angular acceleration sensor comprising:
   a U-shaped frame having an inlet port adapted to receive a pressurized fluid, a network of channels formed therein communicating with said inlet port, and a pair of longitudinally aligned axial recesses formed in said frame operatively connected to said network of channels to form a pair of fluid thrust bearings;
   a rotatable shaft having ends freely received in said axial recesses;
   matched first and second inertial masses connected to said shaft for balanced rotation therewith;
   fluid journal bearing means enclosing a portion of said shaft for low friction support thereof having an inlet port adapted to receive a pressurized fluid;
   support means connecting said journal bearing means to said frame and having a channel formed therein for connecting said journal bearing means inlet port to said network of channels formed in said frame;
   a pair of longitudinally aligned nozzles facing each other in gapped proximity adapted to receive and expel a pressurized fluid;
   a pair of nozzle assemblies carrying respective ones of said nozzles and operatively connected to said frame, said assemblies having respective channels formed therein connecting said nozzles with said network of channels in said frame;
   a flapper rigidly coupled to and extending radially from said shaft between said nozzles to proportion the fluid flow therefrom in response to angular acceleration; and
   output means including respective outlets formed in said nozzle assembly channels for providing signals indicative of the fluid pressure therein.

2. A sensor according to claim 1 further comprising:
   damper surfaces operatively disposed adjacent said pair of inertial masses for opposing rotation thereof with respect to said surfaces.

3. A sensor according to claim 2 wherein:
   said inertial masses including a pair of rectangular masses; and
   said damping surfaces include a pair of upper flat damper plates attached to said support means extending over respective sides of said pair of rectangular masses and a pair of lower flat damper plates connected to the bottom of said frame adjacent respective opposite sides of said rectangular masses, whereby thin films of air are squeezed between said rectangular masses and said pairs of upper and lower damper plates.

4. A fluidic angular acceleration sensor for measuring acceleration of an object, comprising:
support means formed to be fixed to the object;
shaft means rotatably mounted in said support means;
mass means connected to said shaft means for balanced rotation therewith;
opposed nozzle means fixed to said support means and formed to expel pressurized fluid toward each other;
flapper means fixed to and radially extending from said shaft means between said nozzle means to proportion the fluid flow therefrom in response to angular acceleration of the object about the axis of said shaft means; and
damper surfaces fixed to said support means and disposed adjacent said mass means for opposing rotation thereof, said support means comprising a fluid journal bearing enclosing a portion of said shaft means and an inlet port adapted to receive a pressurized fluid for providing a low friction support therefor, said support means further comprising thrust fluid bearings at opposite ends of said shaft means for axially directing pressurized fluid against the ends thereof, an inlet port adapted to receive pressurized fluid, a first channel formed therein communicating between said port and said thrust fluid bearings, a second channel formed therein communicating between said port and said fluid journal bearing, and a third channel formed therein communicating between said inlet port and said nozzles and adapted to communicate with a pressure sensing means, said mass means being of square configuration in a plane normal to the axis of said shaft means; and said damping surfaces comprising upper and lower flat damper plates arranged in gapped alignment with opposite sides of said mass means whereby thin films of air will be squeezed between said damper plates and said mass upon relative movement therebetween.

* * * * *